US011722382B2

(12) United States Patent
Ganguli et al.

(10) Patent No.: US 11,722,382 B2
(45) Date of Patent: Aug. 8, 2023

(54) MANAGING DATA CENTER RESOURCES TO ACHIEVE A QUALITY OF SERVICE

(71) Applicant: Intel Corporation, Santa Clara, CA (US)

(72) Inventors: Mrittika Ganguli, Bangalore (IN); Muthuvel M. I, Bangalore (IN); Ananth S. Narayan, Bangalore (IN); Jaideep Moses, Portland, OR (US); Andrew J. Herdrich, Hillsboro, OR (US); Rahul Khanna, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/494,569

(22) Filed: Oct. 5, 2021

(65) Prior Publication Data

US 2022/0029895 A1    Jan. 27, 2022

Related U.S. Application Data

(63) Continuation of application No. 15/926,866, filed on Mar. 20, 2018, which is a continuation of application
(Continued)

(51) Int. Cl.
*H04L 12/24* (2006.01)
*H04L 41/50* (2022.01)
(Continued)

(52) U.S. Cl.
CPC ............ *H04L 41/50* (2013.01); *H04L 41/145* (2013.01); *H04L 41/5009* (2013.01); *H04L 41/5025* (2013.01)

(58) Field of Classification Search
CPC ... H04L 41/50; H04L 41/145; H04L 41/5009; H04L 41/5025; H04L 41/14; H04L 12/24
See application file for complete search history.

(56) References Cited

U.S. PATENT DOCUMENTS

| 6,748,558 B1 | 6/2004 | Gonzales et al. |
| 7,647,131 B1 | 1/2010 | Sadowski et al. |

(Continued)

OTHER PUBLICATIONS

Final Office Action for U.S. Appl. No. 15/926,866, dated Jan. 4, 2022.

(Continued)

*Primary Examiner* — Schquita D Goodwin
*Assistant Examiner* — Mehulkumar J Shah
(74) *Attorney, Agent, or Firm* — Essential Patents Group, LLP; Christopher K. Gagne (57) ABSTRACT

In accordance with some embodiments, a cloud service provider may operate a data center in a way that dynamically reallocates resources across nodes within the data center based on both utilization and service level agreements. In other words, the allocation of resources may be adjusted dynamically based on current conditions. The current conditions in the data center may be a function of the nature of all the current workloads. Instead of simply managing the workloads in a way to increase overall execution efficiency, the data center instead may manage the workload to achieve quality of service requirements for particular workloads according to service level agreements.

24 Claims, 4 Drawing Sheets

Related U.S. Application Data

No. 13/630,545, filed on Sep. 28, 2012, now Pat. No. 10,554,505.

(51) Int. Cl.
*H04L 41/5025* (2022.01)
*H04L 41/14* (2022.01)
*H04L 41/5009* (2022.01)

(56) References Cited

U.S. PATENT DOCUMENTS

| | | | |
|---|---|---|---|
| 7,730,264 B1* | 6/2010 | Sistla | G06F 12/0813 |
| | | | 711/138 |
| 7,779,238 B2 | 8/2010 | Kosche et al. | |
| 8,115,659 B2 | 2/2012 | Hurley et al. | |
| 8,117,487 B1 | 2/2012 | Raut et al. | |
| 8,229,705 B1 | 7/2012 | Mizrahi et al. | |
| 8,229,726 B1 | 7/2012 | Magdon-Ismail et al. | |
| 8,234,484 B2 | 7/2012 | Indukuru et al. | |
| 8,555,274 B1 | 10/2013 | Chawla et al. | |
| 8,572,295 B1 | 10/2013 | Cai et al. | |
| 8,826,270 B1* | 9/2014 | Lewis | G06F 9/5016 |
| | | | 718/1 |
| 8,963,932 B1 | 2/2015 | Kiel et al. | |
| 9,071,550 B2 | 6/2015 | Tang et al. | |
| 9,310,864 B1 | 4/2016 | Klein et al. | |
| 9,389,910 B2 | 7/2016 | Noel et al. | |
| 9,563,564 B2 | 2/2017 | Herdrich et al. | |
| 9,626,229 B1 | 4/2017 | Krolak et al. | |
| 9,871,742 B2 | 1/2018 | Sesha et al. | |
| 9,996,694 B2 | 6/2018 | Sethumadhavan et al. | |
| 10,303,504 B2 | 5/2019 | Fleming et al. | |
| 10,466,910 B1 | 11/2019 | Dolan et al. | |
| 10,728,121 B1 | 7/2020 | Chitalia et al. | |
| 2003/0065886 A1 | 4/2003 | Olarig | |
| 2005/0132238 A1 | 6/2005 | Nanja | |
| 2006/0248360 A1 | 11/2006 | Fung | |
| 2007/0106769 A1 | 5/2007 | Liu | |
| 2007/0185990 A1 | 8/2007 | Ono et al. | |
| 2007/0300231 A1 | 12/2007 | Aguilar et al. | |
| 2008/0033696 A1 | 2/2008 | Aguaviva et al. | |
| 2008/0155386 A1 | 6/2008 | Jensen | |
| 2008/0263324 A1 | 10/2008 | Sutardja et al. | |
| 2008/0271039 A1 | 10/2008 | Rolia et al. | |
| 2008/0307425 A1 | 12/2008 | Tripathi | |
| 2009/0006755 A1 | 1/2009 | Illikkal et al. | |
| 2009/0070457 A1 | 3/2009 | McKinney | |
| 2009/0133020 A1 | 5/2009 | Itoh | |
| 2009/0172315 A1 | 7/2009 | Iyer et al. | |
| 2009/0182994 A1 | 7/2009 | Bell et al. | |
| 2009/0265568 A1 | 10/2009 | Jackson | |
| 2009/0307697 A1 | 12/2009 | Hurley et al. | |
| 2010/0077185 A1 | 3/2010 | Gopalan et al. | |
| 2010/0095300 A1 | 4/2010 | West et al. | |
| 2010/0115095 A1 | 5/2010 | Zhu et al. | |
| 2011/0004575 A1 | 1/2011 | Yang et al. | |
| 2011/0022812 A1 | 1/2011 | van der Linden et al. | |
| 2011/0055452 A1* | 3/2011 | Suzuki | G06F 1/3243 |
| | | | 710/317 |
| 2011/0107166 A1 | 5/2011 | Flautner et al. | |
| 2011/0154090 A1 | 6/2011 | Dixon et al. | |
| 2011/0161595 A1 | 6/2011 | Fang et al. | |
| 2011/0191776 A1 | 8/2011 | Bose et al. | |
| 2011/0252199 A1 | 10/2011 | Serrano et al. | |
| 2011/0275356 A1 | 11/2011 | Best et al. | |
| 2011/0302372 A1 | 12/2011 | Fontenot et al. | |
| 2012/0042131 A1 | 2/2012 | Flemming et al. | |
| 2012/0096327 A1 | 4/2012 | Cai | |
| 2012/0102270 A1 | 4/2012 | Chishti et al. | |
| 2012/0210068 A1 | 8/2012 | Joshi et al. | |
| 2013/0024871 A1 | 1/2013 | Gao et al. | |
| 2013/0054897 A1 | 2/2013 | Flemming et al. | |
| 2013/0145135 A1* | 6/2013 | Bell, Jr. | G06F 11/30 |
| | | | 712/220 |
| 2013/0185433 A1* | 7/2013 | Zhu | H04L 47/762 |
| | | | 709/226 |
| 2013/0185729 A1 | 7/2013 | Vasic et al. | |
| 2013/0238780 A1 | 9/2013 | Devarakonda et al. | |
| 2013/0268940 A1* | 10/2013 | Gmach | G06F 9/5077 |
| | | | 718/104 |
| 2013/0311804 A1 | 11/2013 | Garg et al. | |
| 2014/0068075 A1 | 3/2014 | Bonilla et al. | |
| 2014/0215041 A1* | 7/2014 | Mann | G06F 9/5088 |
| | | | 709/223 |
| 2014/0229956 A1 | 8/2014 | Fornacus et al. | |
| 2014/0351412 A1 | 11/2014 | Elisha | |
| 2015/0236971 A1 | 8/2015 | Sesha et al. | |
| 2016/0147587 A1 | 5/2016 | An et al. | |
| 2016/0284021 A1 | 9/2016 | Herdrich et al. | |
| 2016/0299697 A1 | 10/2016 | Chen et al. | |
| 2016/0328561 A1 | 11/2016 | Tamir et al. | |
| 2017/0017886 A1 | 1/2017 | Gao et al. | |
| 2017/0024660 A1 | 1/2017 | Chen et al. | |
| 2017/0026238 A1 | 1/2017 | Pignataro et al. | |
| 2017/0076198 A1 | 3/2017 | Jin et al. | |
| 2017/0125073 A1 | 5/2017 | Palmer et al. | |
| 2017/0161612 A1 | 6/2017 | Hastings et al. | |
| 2017/0180399 A1 | 6/2017 | Sukhomlinov et al. | |
| 2017/0251076 A1 | 8/2017 | Bellur | |
| 2017/0300814 A1 | 10/2017 | Shaked et al. | |
| 2018/0137424 A1 | 5/2018 | Gabaldon Royal et al. | |
| 2018/0173549 A1 | 6/2018 | Browne et al. | |
| 2018/0197105 A1 | 7/2018 | Luo et al. | |
| 2018/0285772 A1 | 10/2018 | Gopalan | |
| 2018/0287902 A1 | 10/2018 | Chitalia et al. | |
| 2018/0293023 A1 | 10/2018 | Talwar et al. | |
| 2018/0314533 A1 | 11/2018 | Azhen et al. | |
| 2018/0314615 A1 | 11/2018 | Gay et al. | |
| 2018/0314936 A1 | 11/2018 | Barik et al. | |
| 2019/0004920 A1 | 1/2019 | Vandriessche et al. | |
| 2019/0004922 A1 | 1/2019 | Browne et al. | |
| 2019/0052551 A1 | 2/2019 | Barczynski et al. | |
| 2019/0130101 A1 | 5/2019 | Chen et al. | |
| 2019/0354388 A1 | 11/2019 | Mitra et al. | |

OTHER PUBLICATIONS

Advisory Action for U.S. Appl. No. 13/630,545, dated Feb. 2, 2016.
Advisory Action for U.S. Appl. No. 13/630,545, dated Sep. 6, 2017.
Advisory Action for U.S. Appl. No. 15/637,706, dated Jul. 25, 2019.
Intel Performance Counter Monitor—A better way to measure CPU utilization by Thomas et al. Published Aug. 16, 2012 by Intel.
Notice of Allowance for U.S. Appl. No. 13/630,545, dated Oct. 17, 2019.
Notice of Allowance for U.S. Appl. No. 15/637,706, dated Nov. 14, 2019.
Office Action for U.S. Appl. No. 13/630,545, dated Jan. 11, 2019.
Office Action for U.S. Appl. No. 13/630,545, dated Jan. 26, 2018.
Office Action for U.S. Appl. No. 13/630,545, dated Jul. 19, 2016.
Office Action for U.S. Appl. No. 13/630,545, dated Mar. 21, 2017, 22 pages.
Office Action for U.S. Appl. No. 13/630,545, dated May 21, 2015.
Office Action for U.S. Appl. No. 13/630,545, dated Nov. 5, 2015.
Office Action for U.S. Appl. No. 15/637,706, dated Mar. 30, 2018.
Office Action for U.S. Appl. No. 15/637,706, dated May 15, 2019.
Office Action for U.S. Appl. No. 15/926,866, dated Apr. 29, 2019.
Office Action for U.S. Appl. No. 15/926,866, dated Jan. 13, 2021.
Office Action for U.S. Appl. No. 15/926,866, dated May 15, 2020.
Office Action for U.S. Appl. No. 15/926,866, dated May 27, 2021.
Office Action for U.S. Appl. No. 15/926,866, dated Oct. 30, 2019.
Office Action for U.S. Appl. No. 15/926,866, dated Oct. 9, 2020.
Office Action for U.S. Appl. No. 15/926,866, dated Sep. 20, 2021.
Office Action for U.S. Appl. No. 16/819,604, dated Aug. 19, 2021.
Supplemental Notice of Allowability for U.S. Appl. No. 15/637,706 dated Jan. 23, 2020.
Supplemental Notice of Allowability for U.S. Appl. No. 15/637,706, dated Jan. 10, 2020.
Office Action for U.S. Appl. No. 15/637,706, dated Oct. 18, 2018.

(56) References Cited

OTHER PUBLICATIONS

Final Office Action for U.S. Appl. No. 16/819,604, dated Feb. 28, 2022.
The History of Kubernetes on a Timeline—RisingStack Engineering, retrieved online on Sep. 17, 2021 at https://blog.risingstack.com/the-history-of-kubernetes, 9 pages.
"Borg: The Predecessor to Kubernetes", https://kubernetes.io/blog/2015/04/borg-predecessor-to-kubernetes, Apr. 23, 2015, 4 pages.
Intel Corp., "Intel 64 and IA-32 Architectures Software Developer's Manual", vol. 3B: System Programming Guide, Part 2; Order No. 253669-050US, Feb. 2014.
Iyer, R., et al., "QoS Policies and Architecture for Cache/Memory in CMP Platforms", SIGMETRICS '07, Jun. 12-16, 2007, San Diego, CA, USA.
Moses, J., et al., "Rate-based QoS Techniques for Cache/Memory in CMP Platform", ICES '09 Proceedings of the 23rd International conference on Supercomputing, Jun. 2009, pp. 479-488, retrieved from ACM Digital Library on Aug. 13, 2013, http://dl.acm.org/.
Moses, J., et al., "Shared Resource Monitoring and Throughput Optimization in Cloud-Computing Datacenters", Parallel & Distributed Processing Symposium (IPDPS), 2011 IEEE International, IEEE 2011, 9 pages, retrieved from internet on Jan. 2, 2013, http://www.princeton.edu/-carch/kaisopos/papers/MIMe_IPDPS_2011.
Ren, G., et al., "Google-Wide Profiling: A Continuous Profiling Infrastructure for Data Centers", IEEE Micro (2010), pp. 65-79.
Tang, L., et al., "Compiling for Niceness: Mitigating Contention for QoS in Warehouse Scale Computers", CGO '12, Mar. 31-Apr. 4, 2012, San Jose, CA, USA.
Tirmazi, M., et al., "Borg: The Next Generation", EuroSys '20, Apr. 27-30, 2020, Heraklion, Greece.
Verma, A., et al., "Large-scale cluster management at Google with Borg", EuroSys '15, Apr. 21-24, 2015, Bordeaux, France.
Office Action for U.S. Appl. No. 15/926,866, dated May 24, 2022.
Office Action for U.S. Appl. No. 16/819,604, dated Jun. 9, 2022.
Office Action for U.S. Appl. No. 15/926,866, dated Sep. 23, 2022.
Office Action for U.S. Appl. No. 16/819,604, dated Dec. 8, 2022.

\* cited by examiner

MANAGING DATA CENTER RESOURCES TO ACHIEVE A QUALITY OF SERVICE

BACKGROUND

This relates generally to cloud computing and particularly to data centers for cloud computing.

Cloud computing is a large scale distributed computing center including a plurality of servers. The basis for cloud computing is the economy of scale that may be achieved from large data centers with many servers serving a large number of users who have needs that vary over time. The cloud computing data center includes a pool of abstracted, virtualized, dynamically-scalable managed computing cores together with storage, platforms and services. The cloud computing service is delivered on demand to external customers over the Internet.

In cloud computing, customers contract with the cloud service provider to receive cloud services. In some cases, a legally binding contract known as a service level agreement (SLA) may be entered between the cloud service provider and the customer who wants its applications to run on the cloud. The service level agreement may include things such as a maximum response time, an error rate, and a throughput.

Cloud service providers may have difficulty in consistently providing the performance levels that customers expect or have specifically paid for (quality of service) because the cloud service provider generally receives no information about the nature of the workload. Thus, the data center operated by the cloud service provider may be running many workloads that may produce contention. For example, two different workloads from two different customers may contend within the data center because they both require high usage of cache storage. This may slow performance. But because a cloud service provider has no idea about the characteristics of the workload that it receives, it may very difficult for the cloud service provider to efficiently manage and allocate its resources.

One reason for this lack of information is that the way the cloud service works is that generally the cloud service provider gets no information about the workloads that it is receiving on account of the confidentiality of those workloads. Moreover in order to take all comers, it is preferable, to many cloud service users, that the cloud service provider has no information about the workload itself, the nature of the executables, or the nature of the applications themselves.

BRIEF DESCRIPTION OF THE DRAWINGS

Some embodiments are described with respect to the following figures.

DETAILED DESCRIPTION

In accordance with some embodiments, a cloud service provider may operate a data center in a way that dynamically reallocates resources across nodes within the data center based on both utilization and service level agreements. In other words, the allocation of resources may be adjusted dynamically based on current conditions. The current conditions in the data center may be a function of the nature of all the current workloads. Instead of simply managing the workloads in a way to increase overall execution efficiency, the data center instead may manage the workload to achieve quality of service requirements for particular workloads according to service level agreements.

The data center considers not only the nature of the ongoing performance of workloads but also to the achievement of the quality of service agreements for specific workloads. Thus resources, such as caches, memory capacity, memory bandwidth, bandwidth to disks, etc., may be allocated across the data center based not just on what is best for the overall performance of the data center, but particularly on what is needed to achieve quality of service levels for particular nodes. Therefore, caches may be allocated to nodes unfairly in some cases in order to ensure that workloads with higher quality of service guarantees receive preference.

Figure 1:
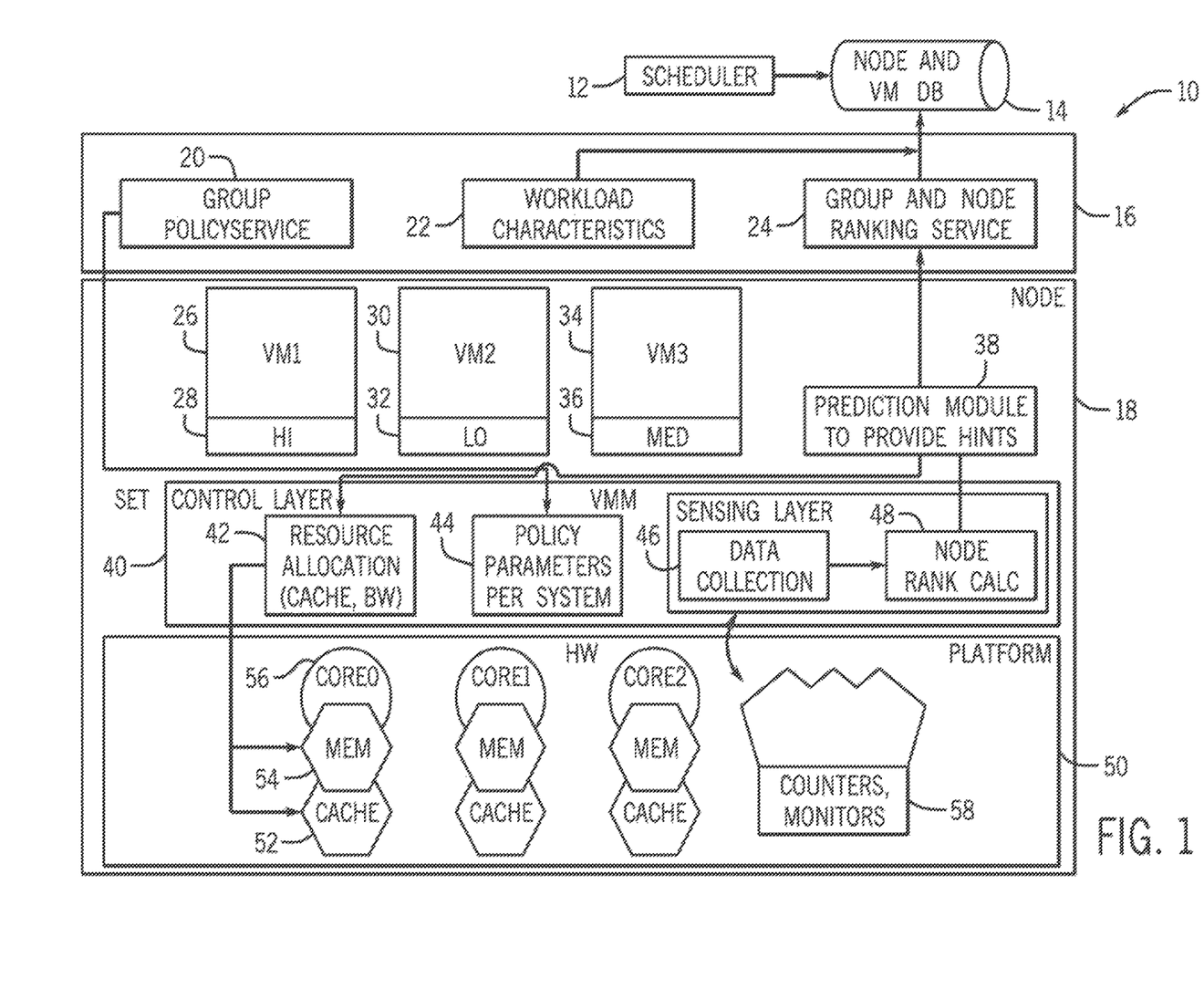
FIG. 1 is a high-level depiction of a cloud quality of service solution according to one embodiment, as disclosed herein.

Referring to FIG. 1, a system for automatically allocating work within a data center 10 may include a number of performance monitors including both counters and monitors 58. Each node corresponds generally to a cluster of cores, or a server or other unit of computing power. Each core may include existing sensors that provide information useful in accessing the performance of that particular node and resources thereon.

In some embodiments it is advantageous to collect sensor data that gives an indication of the performance of certain resources on a node such as cache utilization performance. For example, onboard sensors, in-silicon sensors, performance counters, hardware monitors, and built-in performance monitor counters can be used to estimate cache occupancy. Particularly the kind of information that may be collected, in some cases, includes misses per instruction, latency, memory bandwidth and instructions per cycle.

In some cases the available sensor data may be different across each node or core. But in some embodiments, the system may be able to use whatever available data exists in order to determine a metric that provides a level of current node performance.

The available cache activity data from each core may be used to develop a performance metric that may be normalized across all the nodes within the data center, even in those cases where different nodes include different performance monitoring capabilities. For example, in some cases, both cache misses and instructions per cycle may be monitored in order to access overall performance of caches. As an example of a metric, the number of misses of a particular cache may be determined as a ratio of the total number of misses of caches across the data center in order to determine a metric that may be a normalized measure that enables performance of different caches at particular instances of time to be compared.

Then the array of ratios may be assigned values from zero (being the lowest) to one, to enable a ranking of caches at the current time against other caches. In cases where more than one metric is used, such as a metric for instructions per cycle and for cache misses, the two metrics may be simply added together and then divided by two to give a single scalable performance metric for the core or node.

Then performance may be improved by either avoiding conflicting loads on the same core or moving resources such as caches from being associated with one core to another core. In other words, cache way allocation may be managed across the entire data center. In addition to core/cache mappings workload placement/resource allocation across sockets, across nodes, across racks, etc. may be changed to manage cache allocation across the data center.

Figure 2:
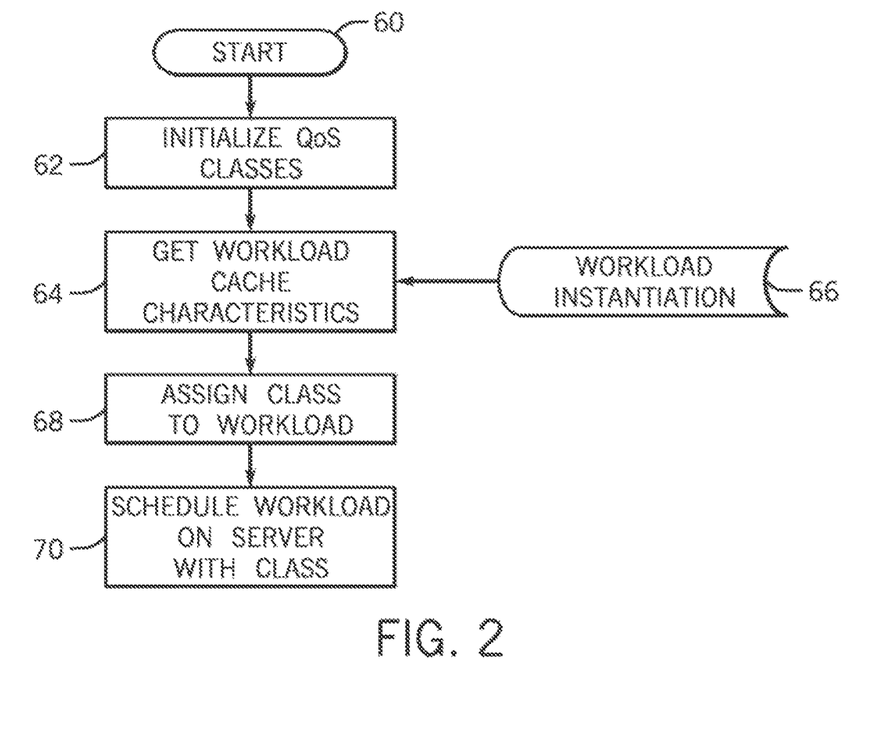
FIG. 2 is a flow chart for a sequence according to one embodiment.

Thus in FIG. 2, the data center 10 may include a scheduler 12 that schedules nodes and virtual machines using a database 14. A group module 16 may include a group policy service 20, a workload characteristic database 22 and a group and node ranking service 24 that provides information to the database 14. Each node 18 may include a plurality of hardware cores, in this case, three cores labeled core0, core1, and core2 within a platform 50. However the number of cores is certainly a variable and may be any number of cores possible with existing technology. Those cores may make use of the counters and performance monitors 58 already onboard the platform 50.

The data center also includes a control layer 40 that includes a resource allocation module that reallocates resources such as caches and bandwidth to meet goals of the system, including improved performance and meeting any application specific quality of service requirements. Policy parameters may be invoked per system using a policy parameter module 44 within the virtual machine monitor (VMM). A sensing layer may include a data collection module 46 and a node rank calculator 48. Thus a data collection module 46 collects data from a variety of platform sources including onboard sensors, in-silicon sensors, performance monitors and whatever else is available. This information is then transformed into a performance ranking to dynamically measure a performance metric on an ongoing basis. This measurement may be through hardware counters in the case of a metric such as instructions per cycle, misses per instruction, latency and memory bandwidth. Then a mechanism may be provided to manage the cache way allocation using the resource allocation module 42.

Machine learning may also be used to predict the dynamic need for cache requirements for each workload going forward. In some embodiments resources such as caches may be dynamically migrated from less needy applications to more cache hungry ones and be allocated or returned as the need for extra cache performance changes. All these allocations may also be based in part on the quality of service guarantee arising from service level agreements.

The sensing layer and service node has a controller including a data collection module 46 to monitor workload performance. It may calculate performance rank on a node-by-node or socket-by-socket basis. In some embodiments node performance is a function of instructions per cycle, misses for instruction, memory bandwidth and socket level latency. Policy parameters defined in the policy parameter module 44 may be based on maximizing instructions per cycle or reducing cache misses as two examples. A prediction module 38 may predict the instructions per cycle of the cache misses as two examples going forward. The prediction module 38 may predict to form hints on how to rebalance resources. The prediction module in one embodiment may create a table of combinations of cache ways, cores and threads that are possible in the particular node. Then it may simulate allocation of random cache ways to each workload mapped to particular cores. Next the prediction module may measure last level cache (LLC) misses, overall instructions per cycle, and memory bandwidth in one embodiment. This data may be used to predict the cache miss rate and the instructions per cycle going forward, given current workloads.

The probabilities of each cache way or amount of cache allocation may be determined to reduce the level of last level cache misses and to increase instructions per cycle. A database may be built against each workload identifier. For each shared cache, the data in terms of the probabilities of each cache way or the amount of cache allocation may be correlated to that of other workloads on the same shared memory. Then a decision tree may be prepared for each core based on the desired impact of each workload. Other prediction mechanisms may also be utilized.

Referring to FIG. 2, in a static partitioning example, cache classes at the server node may be defined upfront and are available to the cloud workload scheduling database 14 in FIG. 1. The scheduler 12 assigns a workload to a particular service class based on the workload's quality of service requirements.

After starting at 60, the quality of service classes may be initialized as indicated in block 62. The workload cache characteristics may be obtained in 64 from a workload instantiation 66. Then a class may be assigned to the workload in 68 and the workload may be scheduled on the server based on the class as indicated in block 70.

In contrast, in dynamic partitioning, the node agents monitor and analyze the monitored data to create models. Cache requirements of a workload may be predicted based on this data. The models and the monitored data are made available to a zone controller but also has the knowledge of the cache requirements of other workloads executing in the group.

Figure 3:
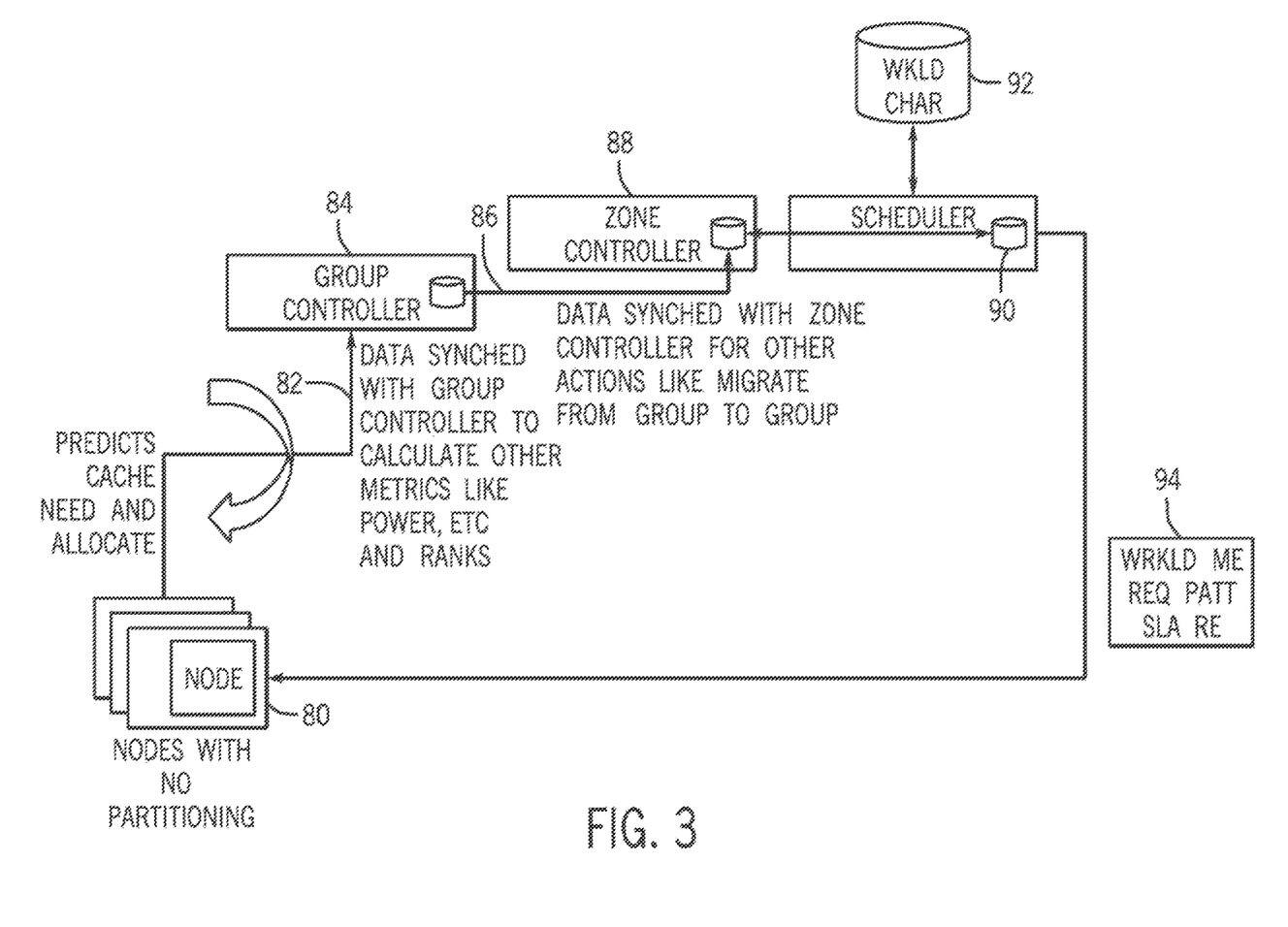
FIG. 3 is a depiction of a dynamic quality of service data flow across nodes, a group and a zone according to one embodiment.

Thus as shown in FIG. 3, the node 80 may be coupled to a group controller 84, in turn coupled to a zone controller 88 which is coupled to a scheduler 90 and a workload characterizer 92. The workload may be scheduled based on the service level agreement requirements contained in a database 94. The node agent among the nodes 80 discovers the settings for every core if present.

Next the workload pattern, and the workload service level agreement, characterized as high, medium or low in one embodiment, at the time of launch may be transferred from the zone to the particular node. This may be done using Extensible Markup Language (XML) in one embodiment. Then the workload virtual machine (VM) is allocated a class of service such as high, medium or low.

The node agent sets an identifier for these cores and maps them to a workload identifier. Then a node sets the monitoring of one or more characteristics based on the identifier. The characteristics could be, in one embodiment, last level cache misses, and memory bandwidth. Next the node monitors other counters per core, and non-core based monitors and feeds them to the prediction logic. The prediction logic creates a rule for the cache needs and allocates cache ways from a pool for the cores associated with this workload based on the predicted need. The cache needs of other cores may be used to allocate caches to all workloads updated based on the prediction logic optimization function. Then the node agent monitors the memory bandwidth availability. If bandwidth starts to exceed a latency bandwidth threshold, the cache allocation is no longer manipulated, as the system has reached a saturation point.

Figure 4:
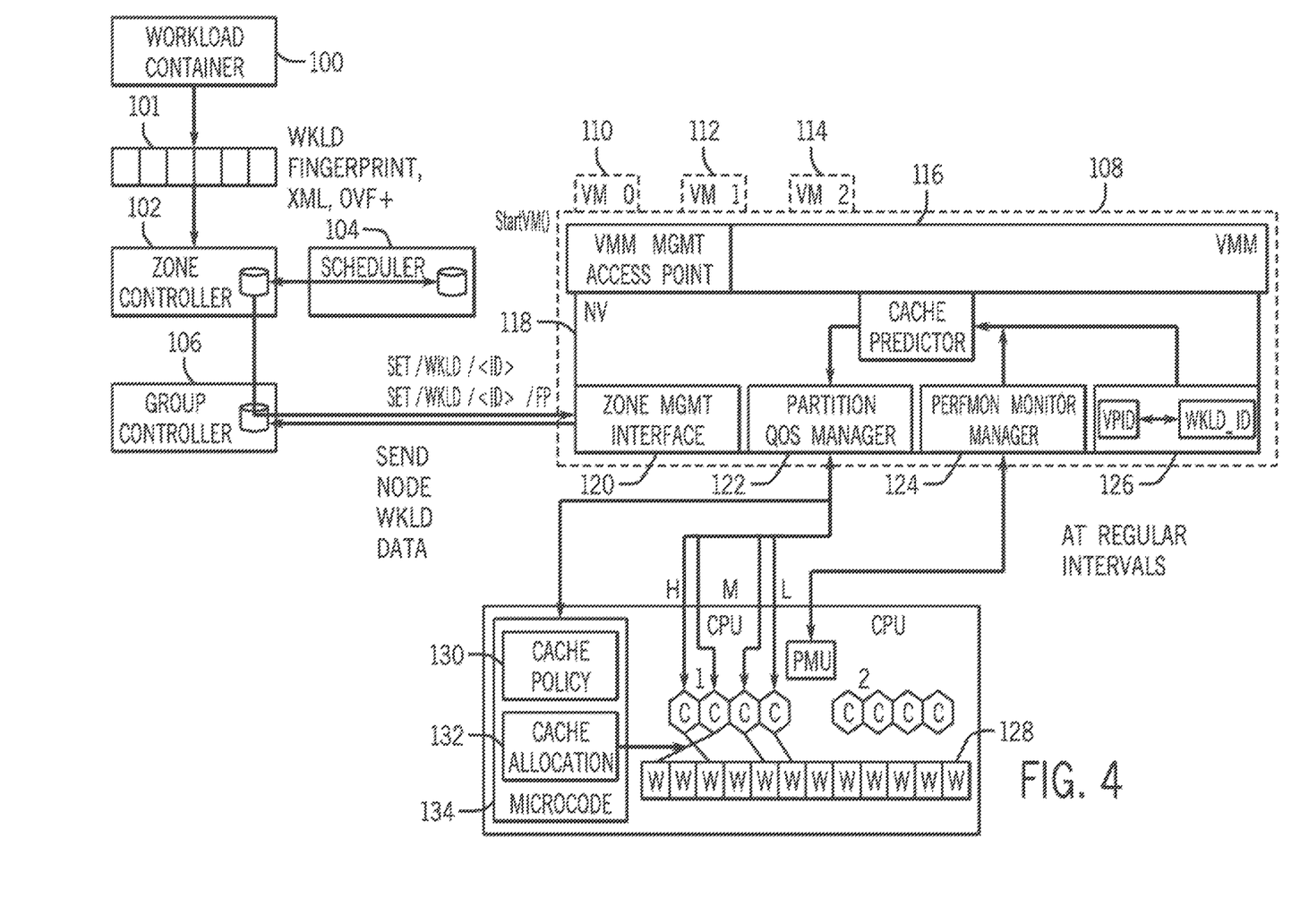
FIG. 4 is a depiction of a cloud workload automation with dynamic cache allocation policy according to one embodiment.

A cloud workload automation with dynamic cache allocation is shown in FIG. 4. It begins by creating a workload pattern 101 for the workload from a workload container 100. For example, a two bit node performance value may be calculated for each node/socket. The node performance may be a function of instructions per cycle, misses per instruction, memory bandwidth and socket latency per cycle. The workload to be placed on a virtual machine 108 on a managed server 118 is transferred through zone controller 102 and group controller 106 to a zone management interface 120. The zone controller is coupled to a scheduler 104. The virtual machines 110, 112, and 114 are provided on the managed server 118 in this example. A database is built against each workload identifier based on quality of service requirements. The cloud scheduler 104 allocates and starts the workload on the virtual machine. The management agent on the server maps each core to classes of service based on what workload is placed on the core. Then the management agent reads performance counters (PMU) for the workload at regular intervals. Monitored data from a performance monitor manager 124, and workload identifier 126 is fed to a cache predictor 136. The processor (CPU) includes microcode 134 to implement a cache policy 130 and cache allocation 132.

Based on the cache prediction, the management agent prepares a mapping of last level cache missed values to cache values required based on a prediction tree and sends it to partition QoS manager 102. A cache policy is set based on that mapping. The agent also sets the threshold for misses standard deviation that will be taken for consideration for cache allocation decisions. Then the processor allocates the cache at regular intervals in some embodiments. The management agent sends server performance data to the cloud service database used by the scheduler to make a decision on scheduling.

Machine learning may be used to identify the optimal distribution of cache resources amongst CPU cores. Each core is running a workload competing for cache resources. The process comprises a training process and reconfiguration process.

The training process comprises profiling the cache miss rate for a short duration of time. During this training cycle, various cache slices and cache sharing configurations are applied. A cost function that validates each of these configurations is given by:

$$\alpha \sum_{i}^{n} \left( \frac{Miss_i}{Hit_i + Miss_i} \right) + \beta \frac{1}{Total\_Miss\_Rate * Max\_Cache} \sum_{i}^{n} (Miss\_Rate_i * Cache_i)$$

where, $\alpha + \beta = 1$;
$Miss_i$ = Number of Misses of CPU I;
$Hit_i$ = Number of Hits of CPU I;
$Miss\_Rate_i$ = Miss rate of CPU I; and
$Cache_i$ = Amount of cache allocated to CPU i.

A training methodology attempts to maximize the above cost function by identifying a cache distribution amongst competing cores.

Once a trained model is obtained, the best cache distribution configuration may be identified and applied through a set of hardware registers.

This process continues to compensate for changes in workload or its phases. The training process is a dynamic process that is always trying to find an optimal cache distribution solution for a given load. Other machine learning techniques may also be used.

ADDITIONAL NOTES AND EXAMPLES

One example embodiment may be one or more computer readable media storing instructions executed by a data center, including a plurality of processors, to perform a sequence analyzing data from a performance monitor from one of said processors, developing a performance metric based on said data, and using the performance metric and a quality of service value to dynamically reallocate resources within the data center. The media may include receiving performance monitor data from at least two cores, each core providing different types of performance monitor data. The media may include analyzing performance monitor data about instructions per cycle. The media may include receiving performance monitor data including cache misses. The media may include receiving performance monitor data about memory bandwidth. The media may include where analyzing data includes analyzing data from a performance monitor to determine instructions per cycle and cache misses. The media may include using the performance metric and quality of service value to reallocate lower level caches within a data center. The media may include reallocating cache space from one node in the data center to another node in the data center.

Another example embodiment may be a method comprising analyzing data from a performance monitor, developing a performance metric based on said data; and using the performance metric and a quality of service value to dynamically reallocate resources within a data center. The method may also include receiving performance monitor data from at least two cores, each core providing different types of performance monitor data. The method may also include analyzing performance monitor data about instructions per cycle. The method may also include receiving measurements of cache occupancy.

One example embodiment may be a server comprising a performance monitor, a processor to analyze data from the performance monitor, develop a performance metric based on said data, use the performance metric and a quality of service value to reallocate resources within a data center, and a storage coupled to said processor. The server may also include said processor to analyze performance monitor data about instructions per cycle. The server may also include said processor to receive performance monitor data including cache misses. The server may also include said processor to receive performance monitor data about memory bandwidth. The server may also include said processor to analyze data includes analyzing data from a performance monitor to determine instructions per cycle and cache misses. The server may also include said processor to use the performance metric and quality of service value to reallocate lower level caches within a data center. The server may also include said processor to reallocate cache space from one node in the data center to another node in the data center. The server may also include said processor to dynamically reallocate data on a periodic basis.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A method implemented using a computer system, the computer system being for use in association with dynamic cloud-based workload and/or data center resource allocation, the computer system comprising multiple hardware central processing unit (CPU) cores associated with multiple server nodes, the multiple hardware CPU cores being associated with CPU performance monitoring hardware to generate cache utilization-related data and memory bandwidth utilization-related data associated with execution of workloads by the multiple CPU cores, the method comprising:
   collecting the cache utilization-related data and/or the memory bandwidth utilization-related data;
   generating, on a socket-by-socket-basis, socket-level workload performance-related data based upon the cache utilization-related data and/or the memory bandwidth utilization-related data; and
   dynamically modifying, based upon (1) quality of service data and (2) the cache utilization-related data and/or the memory bandwidth-related data, allocation of the workloads to resources of the multiple CPU cores so as to address socket-level workload resource contention;
   wherein:
      the dynamically modifying comprises changing at least one workload-to-CPU core placement, based upon the socket-level workload performance-related data, so as to address the socket-level workload resource contention.

2. The method of claim 1, wherein:
the dynamically modifying also comprises changing at least one workload-to-server-node placement.

3. The method of claim 2, wherein:
the collecting comprises reading, at regular intervals, CPU hardware performance counters (PMU); and
the allocation of the workloads to the resources is implemented, at least in part, using a cloud-based scheduler.

4. The method of claim 3, wherein:
the resources of the multiple CPU cores comprise memory bandwidth and/or cache resources; and
the dynamically modifying also comprises changing at least one memory bandwidth allocation and/or at least one cache resource allocation to at least one other of the workloads.

5. The method of claim 4, wherein:
the quality of service data is based, at least in part, upon service level agreement data; and
one or more of the workloads are associated with one or more virtual machines and/or containers.

6. The method of claim 4, further comprising:
using memory bandwidth-based hints in allocating of the resources.

7. Computer system for use in association with dynamic cloud-based workload and/or data center resource allocation, the computer system comprising:
   multiple hardware central processing unit (CPU) cores associated with multiple server nodes, the multiple hardware CPU cores being associated with CPU performance monitoring hardware to generate cache utilization-related data and memory bandwidth utilization-related data associated with execution of workloads by the multiple CPU cores; and
   memory storing instructions to be executed by the computer system, the instructions when executed resulting in the computer system being configured for performance of operations comprising:
      collecting the cache utilization-related data and/or the memory bandwidth utilization-related data;
      generating, on a socket-by-socket-basis, socket-level workload performance-related data based upon the cache utilization-related data and/or the memory bandwidth utilization-related data; and
      dynamically modifying, based upon (1) quality of service data and (2) the cache utilization-related data and/or the memory bandwidth-related data, allocation of the workloads to resources of the multiple CPU cores so as to address socket-level workload resource contention;
   wherein:
      the dynamically modifying comprises changing at least one workload-to-CPU core placement, based upon the socket-level workload performance-related data, so as to address the socket-level workload resource contention.

8. The computer system of claim 7, wherein:
the dynamically modifying also comprises changing at least one workload-to-server-node placement.

9. The computer system of claim 8, wherein:
the collecting comprises reading, at regular intervals, CPU hardware performance counters (PMU); and
the allocation of the workloads to the resources is implemented, at least in part, using a cloud-based scheduler.

10. The computer system of claim 9, wherein:
the resources of the multiple CPU cores comprise memory bandwidth and/or cache resources; and
the dynamically modifying also comprises changing at least one memory bandwidth allocation and/or at least one cache resource allocation to at least one other of the workloads.

11. The computer system of claim 10, wherein:
the quality of service data is based, at least in part, upon service level agreement data; and
one or more of the workloads are associated with one or more virtual machines and/or containers.

12. The computer system of claim 10, wherein:
the operations further comprise using memory bandwidth-based hints in allocating of the resources.

13. Computer system for use in association with dynamic cloud-based workload and/or data center resource allocation, the computer system comprising:
   multiple server nodes comprising multiple hardware central processing unit (CPU) cores, the multiple hardware CPU cores being associated with CPU performance monitoring hardware to generate cache utilization-related data and memory bandwidth utilization-related data associated with execution of workloads by the multiple CPU cores;
   at least one other node associated with at least one cloud-based scheduler; and
   memory storing instructions to be executed by at least certain of the nodes of the computer system, the instructions when executed resulting in the computer system being configured for performance of operations comprising:
      collecting the cache utilization-related data and/or the memory bandwidth utilization-related data from the multiple server nodes;
      generating, on a socket-by-socket-basis, at least in part by the at least one other node, socket-level workload performance-related data based upon the cache utilization-related data and/or the memory bandwidth utilization-related data; and dynamically modifying, by the at least one other node, based upon (1) quality of service data and (2) the cache utilization-related data and/or the memory bandwidth-related data, allocation of the workloads to resources of the multiple CPU cores so as to address socket-level workload resource contention;
wherein:
the dynamically modifying comprises changing at least one workload-to-CPU core placement, based upon the socket-level workload performance-related data, so as to address the socket-level workload resource contention.

14. The computer system of claim 13, wherein:
the dynamically modifying also comprises changing at least one workload-to-server-node placement.

15. The computer system of claim 14, wherein:
the collecting comprises reading, at regular intervals, CPU hardware performance counters (PMU); and
the allocation of the workloads to the resources is implemented, at least in part, using the cloud-based scheduler.

16. The computer system of claim 15, wherein:
the resources of the multiple CPU cores comprise memory bandwidth and/or cache resources; and
the dynamically modifying also comprises changing at least one memory bandwidth allocation and/or at least one cache resource allocation to at least one other of the workloads.

17. The computer system of claim 16, wherein:
the quality of service data is based, at least in part, upon service level agreement data; and
one or more of the workloads are associated with one or more virtual machines and/or containers to be executed in the multiple server nodes.

18. The computer system of claim 16, wherein:
the operations further comprise using, by the at least one other node, memory bandwidth-based hints in allocating of the resources.

19. One or more non-transitory computer readable media storing instructions for execution by a computer system, the computer system being for use in association with dynamic cloud-based workload and/or data center resource allocation, the computer system comprising multiple hardware central processing unit (CPU) cores associated with multiple server nodes, the multiple hardware CPU cores being associated with CPU performance monitoring hardware to generate cache utilization-related data and memory bandwidth utilization-related data associated with execution of workloads by the multiple CPU cores, the instructions, when executed by the computer system, resulting in the computer system being configured for performance of operations comprising:
collecting the cache utilization-related data and/or the memory bandwidth utilization-related data;
generating, on a socket-by-socket-basis, socket-level workload performance-related data based upon the cache utilization-related data and/or the memory bandwidth utilization-related data; and
dynamically modifying, based upon (1) quality of service data and (2) the cache utilization-related data and/or the memory bandwidth-related data, allocation of the workloads to resources of the multiple CPU cores so as to address socket-level workload resource contention;
wherein:
the dynamically modifying comprises changing at least one workload-to-CPU core placement, based upon the socket-level workload performance-related data, so as to address the socket-level workload resource contention.

20. The one or more non-transitory computer readable media of claim 19, wherein:
the dynamically modifying also comprises changing at least one workload-to-server-node placement.

21. The one or more non-transitory computer readable media of claim 20, wherein:
the collecting comprises reading, at regular intervals, CPU hardware performance counters (PMU); and
the allocation of the workloads to the resources is implemented, at least in part, using a cloud-based scheduler.

22. The one or more non-transitory computer readable media of claim 21, wherein:
the resources of the multiple CPU cores comprise memory bandwidth and/or cache resources; and
the dynamically modifying also comprises changing at least one memory bandwidth allocation and/or at least one cache resource allocation to at least one other of the workloads.

23. The one or more non-transitory computer readable media of claim 22, wherein:
the quality of service data is based, at least in part, upon service level agreement data; and
one or more of the workloads are associated with one or more virtual machines and/or containers.

24. The one or more non-transitory computer readable media of claim 22, wherein:
the operations further comprise using memory bandwidth-based hints in allocating of the resources.

* * * * *